(12) United States Patent
Haibel (10) Patent No.: US 7,896,187 B2
(45) Date of Patent: Mar. 1, 2011

(54) LOCKING RING ACTUATOR FOR A PRESSURE RETAINING CLOSURE

(75) Inventor: Joshua Haibel, Louisville, KY (US)

(73) Assignee: Sypris Technologies, Inc., Louisville, KY (US)

( * ) Notice: Subject to any disclaimer, the term of this patent is extended or adjusted under 35 U.S.C. 154(b) by 76 days.

(21) Appl. No.: 11/866,218

(22) Filed: Oct. 2, 2007

(65) Prior Publication Data

US 2009/0084790 A1 Apr. 2, 2009

(51) Int. Cl.
*B65D 53/00* (2006.01)
*B65D 43/26* (2006.01)

(52) U.S. Cl. .................. 220/319; 220/234; 220/233; 220/262; 220/264

(58) Field of Classification Search .................. 220/234, 220/233, 720, 262, 264, 318; 215/271, 279; 49/303
See application file for complete search history.

(56) References Cited

U.S. PATENT DOCUMENTS

| | | | | |
|---|---|---|---|---|
| 1,339,905 | A | * | 5/1920 | O'Connor ................. 220/318 |
| 2,040,024 | A | | 5/1936 | Roberts |
| 2,158,218 | A | * | 5/1939 | Georges Brouhon ........ 220/318 |
| 2,180,606 | A | * | 11/1939 | Oys et al. ................. 220/212.5 |
| 2,558,220 | A | * | 6/1951 | Mclachlan ................ 49/200 |
| 2,616,587 | A | | 11/1952 | Petch |
| 2,721,094 | A | | 10/1955 | Webster |
| 3,449,860 | A | | 6/1969 | Franks, Jr. et al. |
| 3,539,212 | A | | 11/1970 | Poltorak |
| 3,667,649 | A | | 6/1972 | Thillet |
| 4,102,474 | A | | 7/1978 | Platts |
| 4,140,240 | A | * | 2/1979 | Platts ........................ 220/323 |

(Continued)

FOREIGN PATENT DOCUMENTS

| | | |
|---|---|---|
| EP | 0129349 | 12/1984 |
| WO | 02097319 | 12/2002 |

*Primary Examiner*—Anthony Stashick
*Assistant Examiner*—Kareen Rush
(74) *Attorney, Agent, or Firm*—James E. Cole; Middleton Reutlinger (57) ABSTRACT

A pressure retaining closure assembly has a door hingedly mounted to a pipe, vessel, or hub extending therefrom with an arcuate locking ring movably retained proximate an outer perimeter surface thereof. The locking ring is suitable to contract out of a groove in an opening in the pipe, vessel, or hub extending therefrom into an unlocking position and is suitable to expand wherein an outer portion of the locking ring extends into the groove in the opening in the pipe, vessel, or hub extending therefrom into a locking orientation. A locking ring actuator is provided having cylinder with a piston therein. The piston has a rod extending axially therefrom with a portion extending beyond the cylinder. Optionally, a bracket is mounted to the portion of the piston rod extending beyond the cylinder and a bracket is mounted proximate the bottom of the cylinder. In this embodiment, a slider rod may be incorporated where the slider rod has a first end portion mounted to one of the brackets and a second end portion slidingly engaging the other bracket providing stability to the actuator assembly. A ring actuating arm may be pivotally connected to each bracket and secured proximate each end of the arcuate locking ring providing rotating engagement between the piston rod and a first point of the locking ring and rotating engagement between the cylinder and a second point of the locking ring.

22 Claims, 8 Drawing Sheets

U.S. PATENT DOCUMENTS

| | | | |
|---|---|---|---|
| 4,152,871 A * | 5/1979 | Kardash, Jr. | 49/49 |
| 4,222,147 A * | 9/1980 | Burnett, Jr. | 16/62 |
| 4,315,577 A | 2/1982 | Bernson, Jr. | |
| 4,339,843 A * | 7/1982 | Burnett, Jr. | 16/62 |
| 4,387,740 A | 6/1983 | Vanzant | |
| 4,422,651 A | 12/1983 | Platts | |
| 4,515,287 A | 5/1985 | Baudoux et al. | |
| 4,627,763 A * | 12/1986 | Roemer et al. | 404/6 |
| 4,693,278 A | 9/1987 | Wilson et al. | |
| 4,815,163 A * | 3/1989 | Simmons | 16/49 |
| 4,815,627 A | 3/1989 | Marshall | |
| 4,883,637 A | 11/1989 | McDaniels, Jr. | |
| 4,920,609 A * | 5/1990 | Lin | 16/66 |
| 5,035,321 A * | 7/1991 | Denton | 206/225 |
| 5,127,535 A | 7/1992 | Shinno | |
| 5,207,398 A * | 5/1993 | Veaux et al. | 244/100 R |
| 5,700,043 A | 12/1997 | Rohard et al. | |
| 5,743,575 A * | 4/1998 | McFarland | 292/336.3 |
| 6,200,123 B1 | 3/2001 | Mailliet et al. | |
| 6,293,051 B1 | 9/2001 | Matye | |
| 6,308,995 B1 | 10/2001 | Simson | |
| 6,786,670 B2 * | 9/2004 | Smith | 403/323 |
| 6,857,536 B2 * | 2/2005 | Smith | 220/316 |
| 7,036,674 B2 | 5/2006 | McGuire | |
| 7,051,897 B2 * | 5/2006 | McGuire | 220/321 |
| 7,118,472 B2 * | 10/2006 | Kennedy et al. | 454/169 |
| 7,341,161 B2 | 3/2008 | McGuire | |
| 2005/0161957 A1 | 7/2005 | McGuire | |
| 2009/0071969 A1 * | 3/2009 | Lopez | 220/592.17 |

* cited by examiner

LOCKING RING ACTUATOR FOR A PRESSURE RETAINING CLOSURE

BACKGROUND OF THE INVENTION

1. Field of the Invention

The present invention relates generally to closures for pressure vessels or pipes and more specifically to an actuator for a locking member for a pressure retaining closure.

2. Description of the Related Art

Closures for pressure vessels and pipes typically comprise a round door adapted to fit an aperture in the body of the vessel, pipe, or hub extending therefrom. The aperture has an inner circumferential groove for supporting a portion of a locking member. The doors have locking member(s), or portions thereof, proximate a circumferential portion of an outer surface of the door wherein the locking member is engaged to cooperate with the groove about the aperture after the door is closed and seated in the aperture. The locking members are typically comprised of a plurality of arms or blocks slidably mounted adjacent the outer periphery of the door and movable from an unlocked position to a locked position. Other configurations of locking members include arcuate or "C" shaped rings, slotted as well as segmented, that expand to a locking configuration and contract to an unlocking configuration. In an unlocked position, the locking member(s) is within the periphery of the outer surface of the door. In a locked position, a portion of the locking member(s) protrudes beyond the periphery for engagement with the circumferential groove in the aperture. Locking member(s) have load bearing surfaces that engage an external surface of the annular groove in the hub or vessel and a load bearing surface that engages a portion of the external surface of the door. When the internal surface of the door is subjected to pressure, the resultant force is transferred from the external surface of the door to the external surface of the annular groove about the aperture through the locking member(s) wherein an internal load bearing surface cooperates with the external surface of the door and an external load bearing surface cooperates with the external load bearing surface of the annular groove of the hub.

Locking member(s) are moved outward or expanded into a locking position and moved inward or contracted into an unlocking position. In a locked position, a portion of the locking member(s) extends radially beyond the external surface of the door and when in an unlocked position, the locking member(s) are entirely within the external surface of the door. Typically, the locking members are moved between a locked and unlocked position with a manually operated lever that rotates or expands and contracts the locking member(s) into locked and unlocked positions.

SUMMARY OF THE INVENTION

A pressure or vacuum closure having a round door with an actuator suitable to expand an actuated locking member into a locking orientation and to contract the locking member into an unlocking orientation is provided. The arcuate locking member has a "C" shaped configuration and is movably retained proximate an outer surface of the door with retaining clips. The actuator is suitable to contract the locking member out of a circumferential groove in an inner circumference of an opening in a pipe, vessel, or hub extending therefrom and to expand the locking member wherein an outer circumferential portion of the locking member extends into the groove. The locking ring actuator has a cylinder with a piston therein wherein the piston has a piston rod extending axially therefrom with a portion extending beyond the cylinder when the piston is proximate a closed end of the cylinder. The piston rod rotatingly engages a second point of the locking ring and the cylinder rotatingly engages a first point of the locking ring. The locking ring actuator is suitable to contract the locking ring to an unlocking orientation and to expand the locking ring to a locking orientation. Optionally, a bracket is mounted to the portion of the piston rod extending beyond the cylinder body and a bracket is mounted to the cylinder, advantageously proximate the closed end of the cylinder. A slider rod may be incorporated into this embodiment where the slider rod has a first end mounted to one of the brackets and a second end slidingly engaging an aperture in the other bracket providing stability to the actuator assembly. A ring actuating arm may be pivotally connected to each bracket and secured proximate each end of the arcuate locking ring providing the rotating engagement of the piston rod with the second point of the locking ring and the rotating engagement of the cylinder with the first point of the locking ring. The actuator assembly may be single acting with spring extending or spring contracting, double acting, pneumatic, or hydraulic.

BRIEF DESCRIPTION OF THE FIGURES

In order that the invention may be better understood, embodiments of the closure having an actuator in accordance with the present invention will now be described by way of examples. These embodiments are not to limit the scope of the present invention as other embodiments of the actuator of the present invention will become apparent to one having ordinary skill in the art upon reading the instant description. Examples of the present invention are shown in figures wherein.

DETAILED DESCRIPTION OF THE PREFERRED EMBODIMENT(S)

Figure 1:
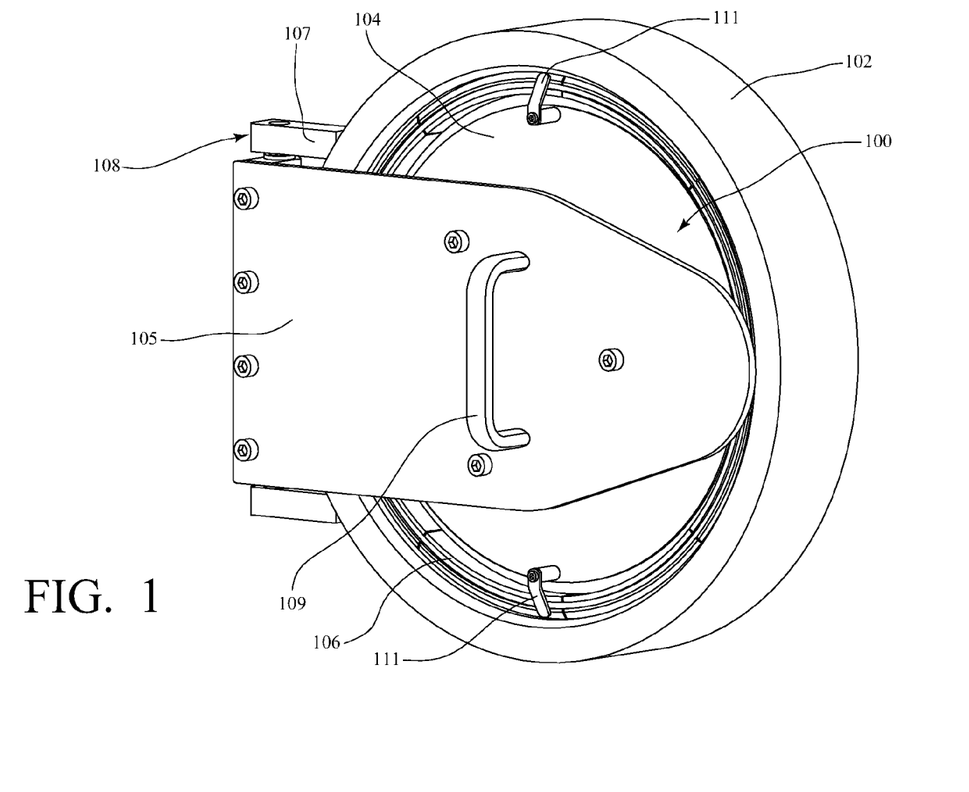
FIG. 1 is a perspective view of an embodiment of a closure in a closed representation showing a door within a hub and components thereof on an outer surface of the door.

FIG. 1 is a perspective view of closure 100 in a closed representation. Closure 100 comprises round door 104 hingedly attached to the outermost annular surface of hub 102 with hinge support arms 107, hinge assembly 108, and cover plate 105. In this closed orientation, door 104 is seated within an inner annular surface of hub 102. Door cover plate 105 extends from hinge assembly 108 about a portion of door 104 and is fastened to an external surface thereof hingedly supporting door 104 to hub 102. Extending outward from door cover plate 105 is handle 109. In this closed orientation, arcuate locking ring 106 is expanded having a portion visible about an external surface of door 104 and a portion within groove 116 (shown in FIG. 2b) in an inner annular surface of hub 102. Clips 111 moveably hold locking ring 106 proximate the outer circumferential edge of the outer surface of door 104 allowing locking ring 106 to expand into and contract out of groove 116 in hub 102.

Figures 2A, 2B:
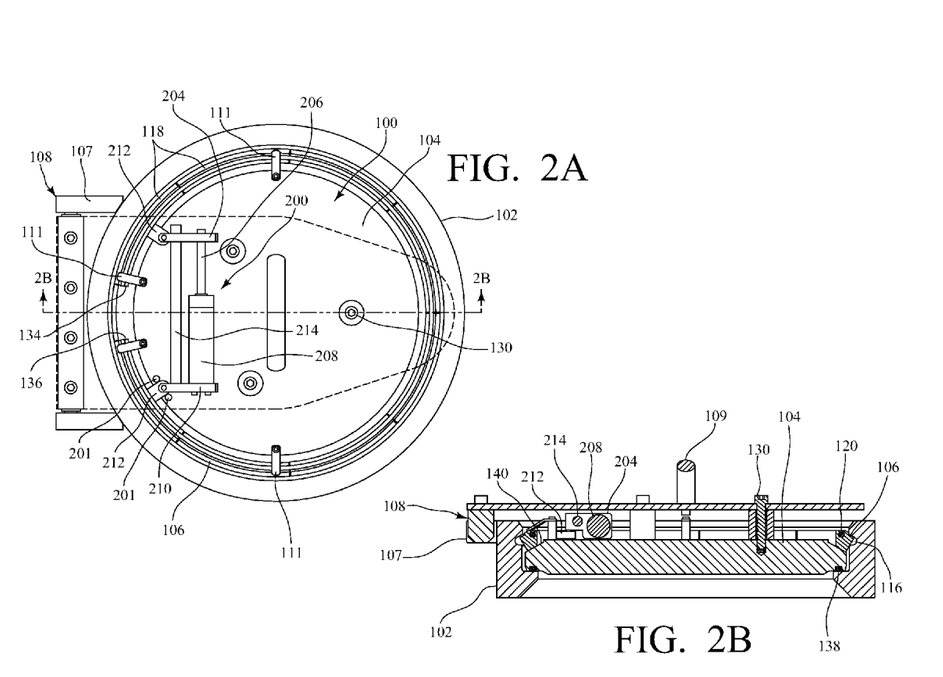
FIG. 2A is a frontal view of the closure of FIG. 1 showing the orientation of an actuator assembly with respect to a door in a closed position within a hub.
FIG. 2B is a cross-sectional view of the closure of FIG. 2A showing the orientation of the locking ring, actuator assembly, hinge assembly, and sealing gasket with respect to a door and a hub.

FIGS. 2A and 2B show door 104 in a closed orientation within hub 102. Door 104 has outwardly tapered or frustoconical outer load bearing surface 140 proximate the inner annular surface of hub 102 which cooperates with an axially inward facing load bearing surface of locking ring 106. It is to be understood that actuator assembly 200 may be used in conjunction with a variety of configurations of locking rings 106 and doors 104. Hub 102 has inner annular groove 116 proximate the outer circumferential surface of door 104. The axially inward facing load bearing surface of inner annular groove 116 cooperates with an axially outward facing load bearing surface of locking ring 106. Locking ring 106 is shown as a plurality of segments 118 retained together with connecting ring 120. However, it is to be understood that actuator assembly 200 is suitable and may be used with any locking ring as is known by a person having ordinary skill in the art. Locking ring 106 may have a plurality of configurations forming an expandable locking ring 106 with axially inward and outward facing load bearing surfaces. For example, locking ring 106 may be slotted or continuous or may have a symmetrical or asymmetrical cross-sectional configuration as is known in the art. Cover plate 105 is secured to door 104 with a plurality of fasteners 130. Sealing gasket 138 is shown within a circumferential groove about an inner surface of door 104 proximate an outer circumference. Sealing gasket 138 may be of any configuration as is known in the art which imparts a seal between an inner surface of door 104 and hub 102.

Actuator assembly 200 is in an expanded locking orientation about an outer surface of door 104. Locking ring actuator assembly 200 has cylinder 208 with a piston therein and piston rod 206 extending axially therefrom with a portion extending beyond cylinder 208. One ring actuating arm 212 rotatingly engages lower cylinder bracket 210 and a first point of arcuate locking ring 106. Another ring actuating arm 212 rotatingly engages upper cylinder bracket 204 and a second point of arcuate locking ring 106. The first and second points of locking ring 106 are spaced from but proximate ends 134 and 136 thereof. Slider rod 214 has a first end mounted to cylinder 208 with lower cylinder bracket 210 and a second end portion slidingly engaging piston rod 206 with upper cylinder bracket 204. It is to be understood that actuator assembly 200 may have other orientations, therefore the terms upper and lower may be interchanged as piston rod 206 may extend to lower bracket 210 or guide posts 201 may be positioned about upper actuating arm 212. Guide posts 201 extend outwardly from the outer surface of door 104 proximate each side of lower actuating arm 212 keeping the first point of arcuate locking ring 106 from rotating about the outer surface of door 104. Guide posts 201 are spaced radially inward on door 104 from locking ring 106 providing a space for the contraction of locking ring 106. End faces 134 and 136 of locking ring 106 are gap spaced and are each proximate a retaining clip 111 in this expanded locking orientation about door 104.

Figure 3A:
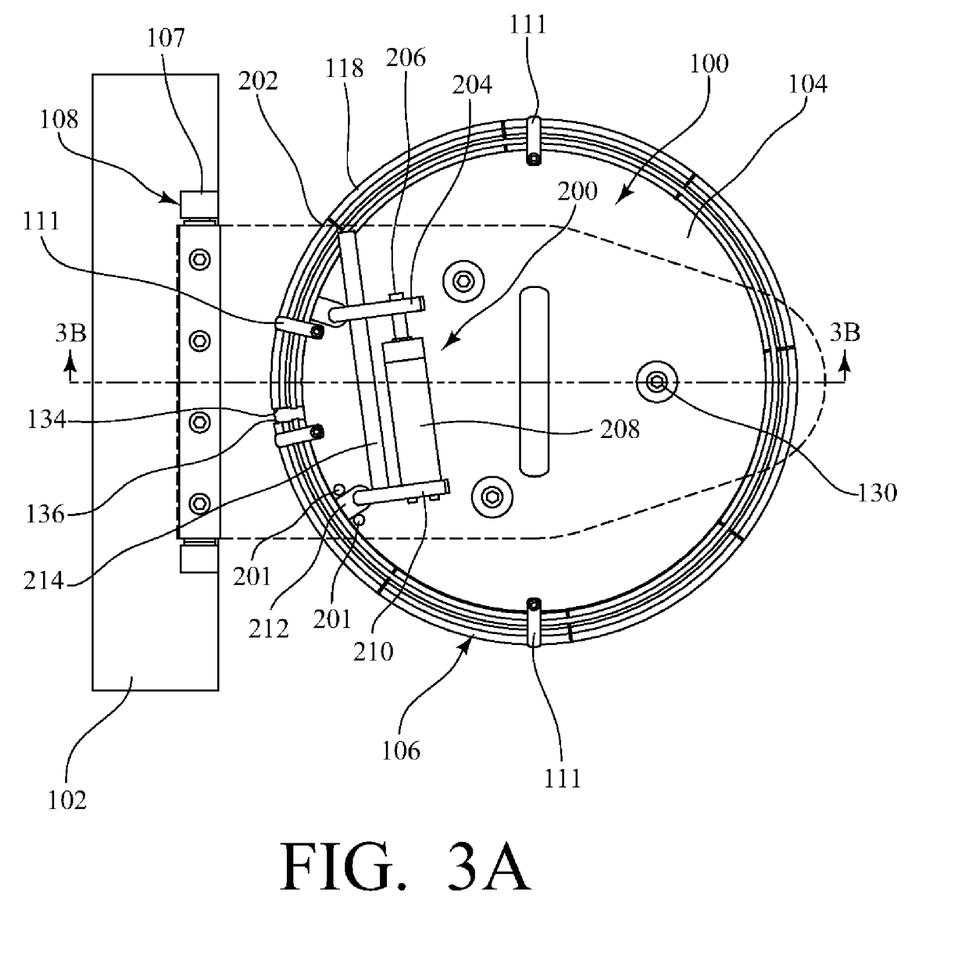
FIG. 3A is a frontal view of the closure of FIG. 1 showing the orientation of an actuator assembly with respect to a door in an open position about a hub.
Figure 3B:
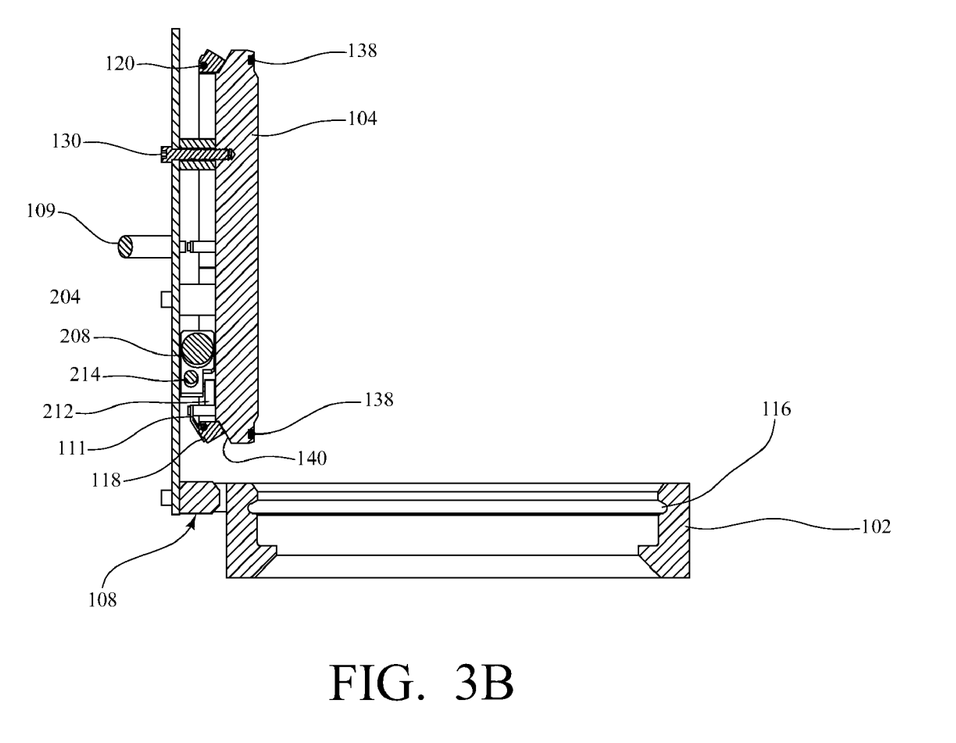
FIG. 3B is a cross-sectional view of the closure of FIG. 3A showing the orientation of the actuator and locking ring in a retracted, open orientation about a door.

FIGS. 3A and 3B show door 104 in an open orientation hingedly attached to hub 102 with hinge assembly 108 supported to hub 102 with hinge support arms 107. End faces 134 and 136 of locking ring 106 are drawn together with locking ring actuator assembly 200 wherein locking ring 106 is substantially within an outer circumferential surface of door 104. Door 104 has locking ring 106 contracted to an inner portion of outwardly tapered or frustoconical outer load bearing surface 140 and removed from groove 116 of hub 102. Actuator assembly 200 is in a retracted unlocking orientation about an outer surface of door 104. Locking ring actuator assembly 200 has cylinder 208 with a piston therein and piston rod 206 extending axially therefrom with a portion extending beyond cylinder 208. One ring actuating arm 212 rotatingly engages lower cylinder bracket 210 and a first point of arcuate locking ring 106. Another ring actuating arm 212 rotatingly engages upper cylinder bracket 204 and a second point of arcuate locking ring 106. The first and second points of locking ring 106 are spaced from but proximate ends 134 and 136 thereof. Slider rod 214 has a first end mounted to cylinder 208 with lower cylinder bracket 210 and a second end portion slidingly engaging piston rod 206 with upper cylinder bracket 204. Guide posts 201 extend outwardly from the outer surface of door 104 proximate each side of lower actuating arm 212 keeping the first point of arcuate locking ring 106 from rotating about the circumference of door 104. Guide posts 201 are proximate locking ring 106 which is in a contracted unlocking orientation. End faces 134 and 136 of locking ring 106 are proximate each other and end face 134 is circumferentially moved about door 104 while end face 136 is held in a substantially constant circumferential orientation about door 104 with guide posts 201. Retaining clips 111 hold locking ring 106 about door 104.

Figure 4:
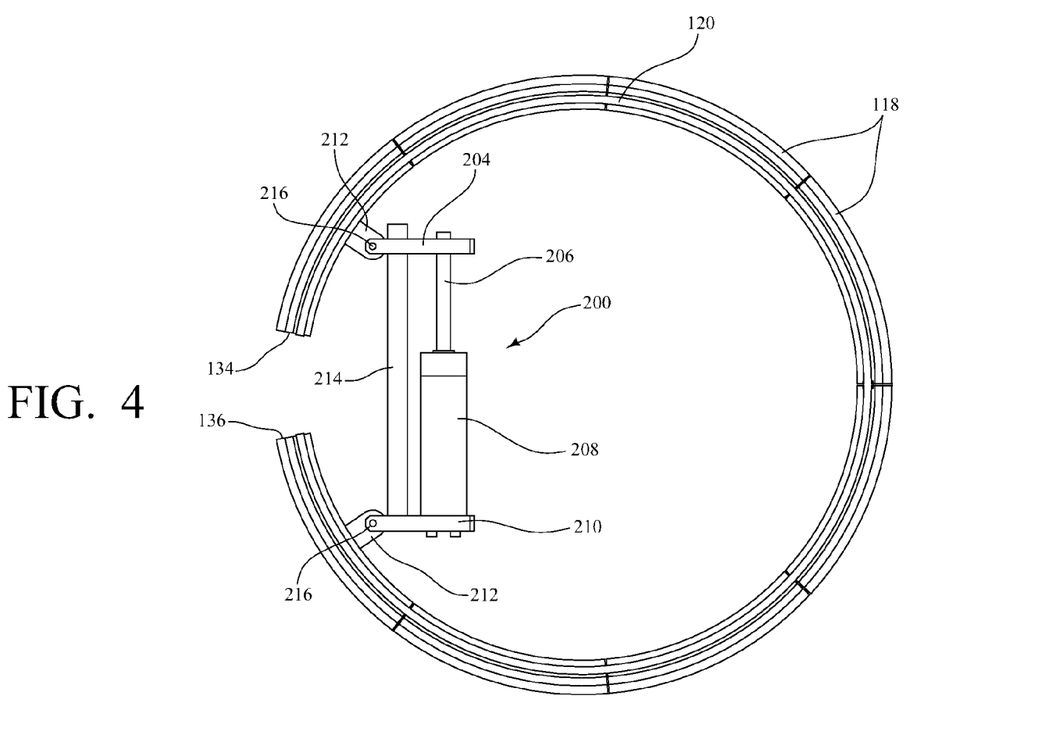
FIG. 4 is a frontal view of the locking ring of FIG. 1 showing an actuator engaged therewith in an expanded orientation.

FIG. 4 shows a front view of locking ring 106 held in a closed or expanded orientation with actuator assembly 200. Locking ring 106 has a plurality of locking segments 118 retained together with connecting ring 120 forming arcuate or "C" shaped segmented locking ring 106. It is to be understood that locking ring actuator assembly 200 may be used with a segmented, continuous, slotted, or any other locking ring as is known in the art. Locking ring 106 has end faces 134 and 136 gap spaced and movable towards each other allowing radial expansion and contraction of the locking ring 106. Connecting ring 120 resides within an arcuate cavity within each locking segment 118 and is comprised of a flexible material, such as spring steel, suitable for expanding and contracting locking ring 106. Actuator assembly 200 is in an expanded orientation gap spacing end faces 134 and 136 of locking ring 106. Locking ring actuator assembly 200 has cylinder 208 with a piston therein and piston rod 206 extending axially therefrom with a portion extending beyond cylinder 208. In this expanded orientation, a large portion of piston rod 206 extends beyond cylinder 208 separating upper cylinder bracket 204 from lower cylinder bracket 210. One ring actuating arm 212 rotatingly engages lower cylinder bracket 210 with a first dowel pin 216 and is fixed to a first point of arcuate locking ring 106. Another ring actuating arm 212 rotatingly engages upper cylinder bracket 204 with a second dowel pin 216 and is fixed to a second point of arcuate locking ring 106. The first and second points of locking ring 106 are spaced from but proximate end faces 134 and 136. Slider rod 214 has a first end mounted to cylinder 208 with lower cylinder bracket 210 and a second end portion slidingly engaging piston rod 206 with upper cylinder bracket 204. Slider rod 214 being connected to lower bracket 210 and slidingly received within upper bracket 204 provides stability to actuator assembly 200 about door 104.

Figure 5:
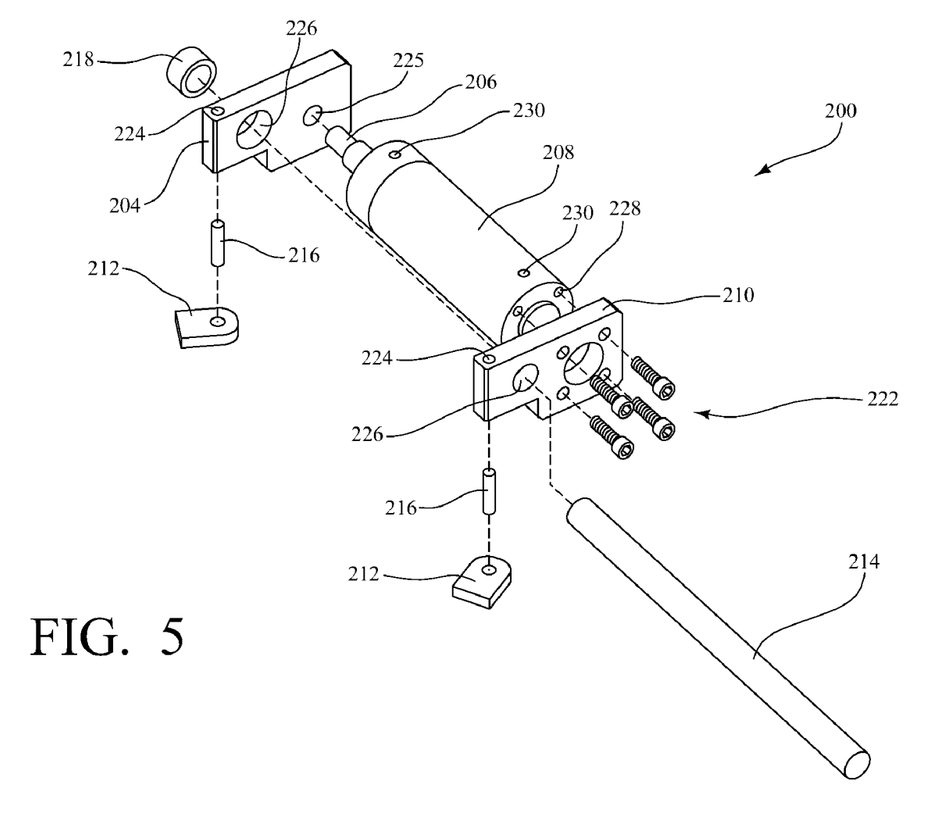
FIG. 5 is an exploded view of a locking ring actuator assembly showing component parts thereof.

FIG. 5 is an exploded view of locking ring actuator assembly 200 showing component parts thereof and inter-relationship therewith. Actuator assembly 200 has cylinder 208 with a piston therein and piston rod 206 extending axially therefrom. Advantageously, cylinder 208 has two ports 230, one proximate each end of cylinder 208, providing for the injection and extraction of a gas or fluid about a top and bottom of the piston in cylinder 208. Advantageously, the piston within cylinder 208 is double acting wherein a fluid or gas is injected into a first port 230 and simultaneously extracted from a second port 230. Actuator assembly 200 may by pneumatic or hydraulic. Additionally, actuator assembly 200 may be single acting with spring extending or spring contracting.

When piston rod 206 is retracted within cylinder 208, as shown here, a portion extends beyond cylinder 208. Upper cylinder bracket 204 is mounted to the portion of piston rod 206 extending beyond cylinder wall 208 with axially aligned aperture 225. Aperture 226 is also axially aligned with piston rod 206 and is spaced at least the radius of cylinder 208 from a center of aperture 225 and provides sliding engagement of slider rod 214 with piston rod 206. Advantageously, bushing 218 is retained in aperture 226 providing slidingly engagement with slider rod 214. Lower cylinder bracket 210 is mounted to the bottom of cylinder 208 with fasteners 222 and extends radially beyond cylinder 208 with aperture 226 therein receiving and retaining slider rod 214. In the embodiment shown, fasteners 222 are threaded bolts suitable for being fasteningly received within threaded apertures 228 in the bottom of cylinder 208. It is to be understood that any means as is known in the art may be employed to secure lower bracket 210 to cylinder 208. Slider rod 214 has a first end retained within aperture 226 of lower cylinder bracket 210 and a portion proximate a second end that slidingly engages upper bracket 204 through aperture 226. Each bracket, 204 and 206, has an aperture 224 receiving a dowel pin 216. Each dowel pin 216 is engaged with a ring actuating arm 212 providing rotating engagement between an actuating arm 212 and each bracket, 204 and 206. Each actuating arm 212 is attached to locking ring 106 as shown in FIG. 4.

As shown in the figures, upper bracket 204 having aperture 226 slidingly receiving slider rod 214 extending from the lower bracket 210 stabilizes actuator assembly 200 about door 104. Brackets 102 and 104 are pivotally connected to "C" or arcuate locking ring 106 proximate but spaced from each end 134 and 136 with ring actuating arms 212. This configuration allows slider rod 214 to move vertically relative to locking ring 106 when expanded or contracted and actuator assembly 200 moves in relation to the locking ring translation and slides freely about the exterior surface of door 104. This is shown explicitly in FIG. 2A wherein end face 134 is proximate an outer portion of clip 111 and actuator assembly 200 is orientated vertically in this locked orientation. In FIG. 3A, actuator assembly 200 is in a retracted unlocked orientation and end face 134 is drawn down toward end face 136.

Figures 6A, 6B:
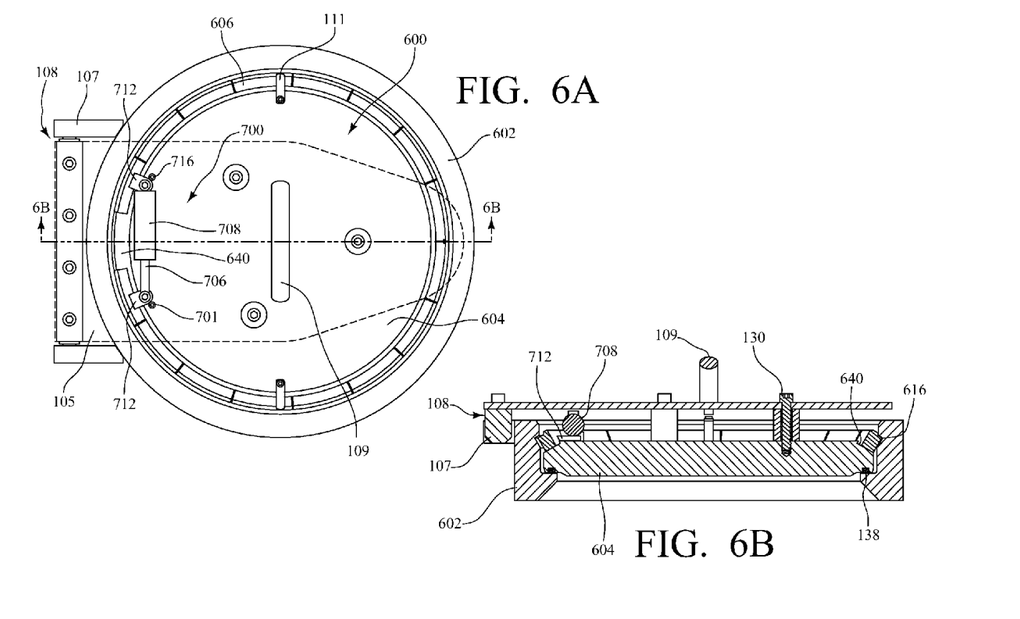
FIG. 6A is a frontal view an alternative embodiment of an actuator assembly showing the orientation of the actuator assembly with respect to a door in a closed position within a hub.
FIG. 6B is a cross-sectional view of the closure of FIG. 6A showing the orientation of the locking ring, actuator assembly, hinge assembly, and sealing gasket with respect to a door and a hub.
Figure 7:
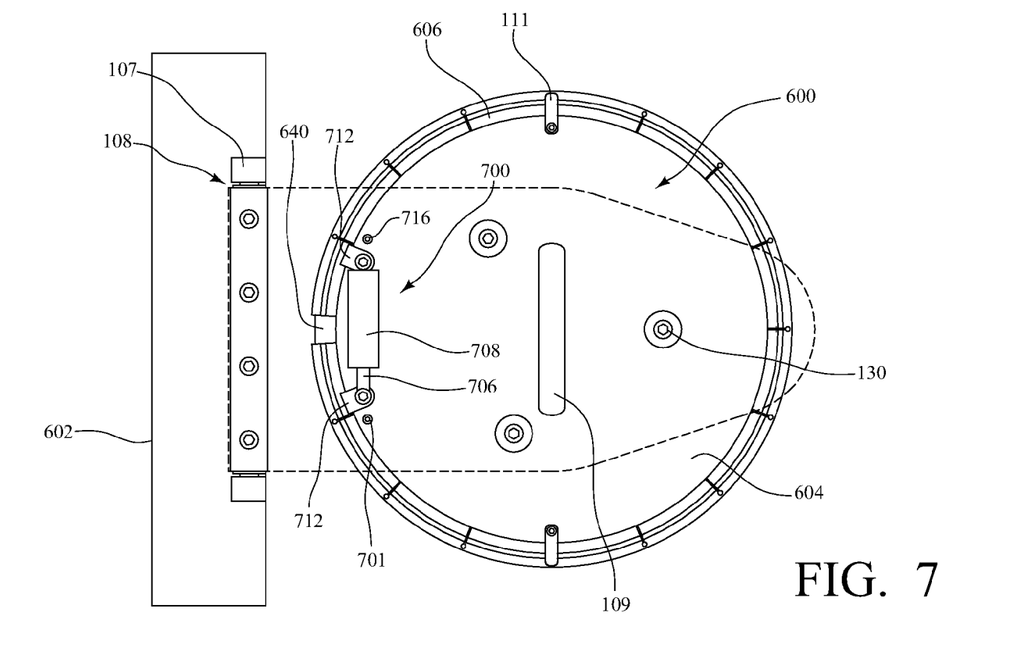
FIG. 7 is a frontal view of the closure of FIG. 6 showing the orientation of an actuator assembly with respect to a door in an open position about a hub.

FIGS. 6A and 6B show an alternative embodiment of a locking ring actuator. Door 604 in a closed orientation within hub 602. Door 604 has outwardly tapered or frustoconical outer load bearing surface 640 proximate the inner annular surface of hub 602 which cooperates with an axially inward facing load bearing surface of locking ring 606. Hub 602 has inner annular groove 616 proximate the outer circumferential surface of door 604. The axially inward facing load bearing surface of inner annular groove 616 cooperates with an axially outward facing load bearing surface of locking ring 606. Locking ring 606 is shown as a slotted locking ring (FIG. 7). It is to be understood that locking ring 606 may be continuous, segmented, or of another configuration as is known in the art. Cover plate 105 extends from hinge assembly 108 and is secured to door 604 with a plurality of fasteners 130. Sealing gasket 138 is shown within a circumferential groove about an inner surface of door 604 proximate an outer circumference. Actuator assembly 700 is in an expanded locking orientation about an outer surface of door 604 wherein an outer circumferential portion of locking ring 606 is engaged in groove 616 within an inner circumferential surface proximate an opening in hub 602. Locking ring actuator assembly 700 has cylinder 708 with a piston therein and piston rod 706 extending axially therefrom with a portion extending beyond cylinder 708. One ring actuating arm 712 rotatingly engages piston rod 706 and a first point of arcuate locking ring 606. A second ring actuating arm 212 rotatingly engages cylinder 708 and a second point of arcuate locking ring 606. Upper guide post 716 extends outwardly from the outer surface of door 604 proximate an upper edge of second actuating arm 712 and lower guide post 701 extends outwardly from the outer surface of door 604 proximate a lower edge of first actuating arm 712 keeping actuator assembly 700 and locking ring 606 from rotating about the outer surface of door 604. Guide posts 701 and 716 are spaced radially inward on door 604 from locking ring 606 providing a space for the contraction of locking ring 606. Retaining clips 111 are spaced about the outer surface of door 604 holding locking ring 606 proximate an outer circumferential edge thereof.

FIG. 7 shows closure 600 with door 604 in an open orientation hingedly attached to hub 602 with hinge assembly 108 supported to hub 602 with hinge support arms 107. The end faces of slotted locking ring 606 are drawn together with locking ring actuator assembly 700 wherein locking ring 606 is contracted to a circumference less than the inner circumference of the outer portion of the outer opening in hub 602. Door 604 has locking ring 606 contracted to an inner portion of frustoconical outer load bearing surface 640 and removed from groove 616 of hub 602. Actuator assembly 700 is in a retracted unlocking orientation about an outer surface of door 604 wherein upper and lower ring actuating arms 712 are drawn together. Locking ring actuator assembly 700 has cylinder 708 with a piston therein and piston rod 706 extending axially therefrom with a portion extending beyond cylinder 708. One ring actuating arm 712 rotatingly engages cylinder 708 and a first point of arcuate locking ring 606 and another ring actuating arm 712 rotatingly engages piston rod 706 and a second point of arcuate locking ring 606. Upper guide post 716 and lower guide post 701 are spaced from actuating arms 712 when actuator assembly 700 is in the retracted orientation. However, upper guide post 716 or lower guide post 701 may remain adjacent or proximate a ring actuating arm 712 when actuator assembly 700 is retracted. Other embodiments of guide posts as are known in the art, such as a single slotted guide post slidingly receiving an appendage from actuator assembly 700 or a ring actuating arm 712, may be used in conjunction with the actuator of the instant invention.

The locking ring actuator of the present invention provides a cylinder having a movable piston therein and a piston rod axially extending from the piston. The cylinder rotatingly engages a first point of an arcuate locking ring and the piston rod rotatingly engages a second point of the arcuate locking ring. The locking ring is moveably retained proximate an outer circumference of a door and is suitable to be expanded and contracted. The locking ring actuator provides the force necessary to contract the locking ring to an extent where the outer radius is less than an inner radius of a groove in an inner circumference of an opening in a container. The locking ring actuator also provides the force necessary to expand the locking ring to an extent where the outer radius is greater than the inner radius of the groove in the inner circumference of the opening. Thus, the locking ring actuator changes the orientation of the locking ring about an outer surface of a door from an unlocked position to a locked position.

I claim:

1. A closure for an opening in a pipe, vessel, or hub extending therefrom comprising:
   a round door having an inner and outer surface;
   an arcuate expandable locking ring movably retained proximate an outer circumference of said outer surface of said door;
   said arcuate locking ring being suitable to expand and contract wherein an outer circumferential portion of said locking ring is suitable to engage a groove within an inner circumferential surface of said opening when said locking ring is in an expanded orientation and is suitable to contract to a circumference less than the inner circumference of said opening; and
   a locking ring actuator having a cylinder with a piston slidably disposed therein, said piston having a piston rod extending axially therefrom with a portion extending beyond said cylinder, said cylinder rotatingly engaging a first point of said arcuate locking ring, said portion of said piston rod extending beyond said cylinder rotatingly engaging a second point of said arcuate locking ring wherein said locking ring actuator moves in relation to radial expansion and contraction of said locking ring.

2. The closure of claim 1 further comprising an upper bracket mounted to said portion of said piston rod extending beyond said cylinder providing said rotating engagement between said piston rod and said second point of said arcuate locking ring.

3. The closure of claim 1 further comprising a lower bracket mounted to a lower portion of said cylinder providing said rotating engagement between said cylinder and said first point of said arcuate locking ring.

4. The closure of claim 1 further comprising an upper bracket mounted to said portion of said piston rod extending beyond said cylinder and having a portion extending radially beyond said cylinder providing said rotating engagement between said piston rod and said second point of said arcuate locking ring, a lower bracket mounted to a lower portion of said cylinder and having a portion extending radially beyond said cylinder providing said rotating engagement between said cylinder and said first point of said arcuate locking ring, and a slider rod having a first end mounted to said lower bracket and a second end portion slidingly engaging said upper bracket.

5. The closure of claim 4 wherein said upper bracket has an aperture with a bushing therein slidingly receiving said second end portion of said slider rod providing said slidingly engagement between said upper bracket and said second end portion of said slider rod.

6. The closure of claim 4 wherein said portion of said lower bracket extending radially beyond said cylinder wall has an aperture with said first end of said slider rod secured therein.

7. The closure of claim 1 wherein said locking ring actuator is pneumatically powered.

8. The closure of claim 1 wherein said locking ring actuator is hydraulically powered.

9. The closure of claim 1 wherein said cylinder is double acting.

10. The closure of claim 1 wherein said cylinder is single acting.

11. The closure of claim 1 further comprising an upper bracket mounted to said portion of said piston rod extending beyond said cylinder, a lower bracket mounted to a lower portion of said cylinder, and a ring actuating arm providing said rotating engagement of said upper bracket with said second point of said arcuate locking ring, and a ring actuating arm providing said rotating engagement of said lower bracket with said first point of said arcuate locking ring.

12. The closure of claim 11 wherein each of said actuating arms are secured proximate to but spaced from each end of said arcuate locking member.

13. The closure of claim 11 wherein each of said actuating arms are rotatingly mounted to said brackets with a dowel pin received within an aperture in said actuating arm and within an aperture within said bracket.

14. The closure of claim 1 wherein said arcuate locking ring has a plurality of arcuate segments flexibly connected with an arcuate connecting ring.

15. The closure of claim 1 wherein said arcuate locking ring is a continuous band.

16. The closure of claim 1 wherein said arcuate locking ring is a continuous band having substantially equidistant radially oriented slots extending from an inner circumferential surface toward an outer circumferential surface, said slots having a length less than a radial thickness of said locking ring.

17. The closure of claim 11 having a guide post extending from said outer surface of said door proximate a lower edge of one of said ring actuating arms and a guide post extending from said outer surface of said door proximate an upper edge of one of said ring actuating arms substantially maintaining a circumferential orientation of said arcuate locking ring about said door.

18. A closure assembly comprising:
   a door hingedly mounted to a pipe, vessel, or hub extending therefrom, said pipe, vessel, or hub having a round opening with a circumferential groove therein;
   an arcuate locking ring movably retained proximate an outer perimeter of an outer surface of said door being suitable to contract to a radius less than a radius of said round opening exterior of said groove and being suitable to expand wherein an outer portion of said locking ring extends into said groove; and
   a locking ring actuator having cylinder with a piston slidably positioned therein, said piston having a piston rod extending axially upward therefrom with a portion extending beyond said cylinder when said piston is proximate a lower portion of said cylinder, an upper cylinder bracket mounted to said portion of said piston rod extending beyond said cylinder, a lower cylinder bracket mounted proximate the bottom of said cylinder, a slider rod having a first end portion mounted to said lower bracket and a second end portion slidingly engaging said upper bracket, a ring actuating arm pivotally connected to said upper bracket and secured proximate an end of said arcuate locking ring, and a ring actuating arm pivotally connected to said lower bracket and secured proximate the other end of said arcuate locking ring wherein said locking ring expands and contracts radially upon actuation of said locking ring actuator and wherein said locking ring actuator moves with said locking ring expansion and contraction.

19. The closure of claim 18 wherein said locking ring actuator is pneumatically powered.

20. The closure of claim 18 wherein said locking ring actuator is hydraulically powered.

21. The closure of claim 18 wherein said cylinder is double acting.

22. The closure of claim 18 wherein said cylinder is single acting.

* * * * *

UNITED STATES PATENT AND TRADEMARK OFFICE
CERTIFICATE OF CORRECTION

PATENT NO.        : 7,896,187 B2                                    Page 1 of 1
APPLICATION NO.   : 11/866218
DATED             : March 1, 2011
INVENTOR(S)       : Haibel

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 116 days.

Signed and Sealed this
Tenth Day of December, 2013

Margaret A. Focarino
*Commissioner for Patents of the United States Patent and Trademark Office*